July 30, 1929. H. PARKER 1,722,676
REDUCER FOR FIBROUS CONDUITS
Filed Sept. 16, 1925 3 Sheets-Sheet 1
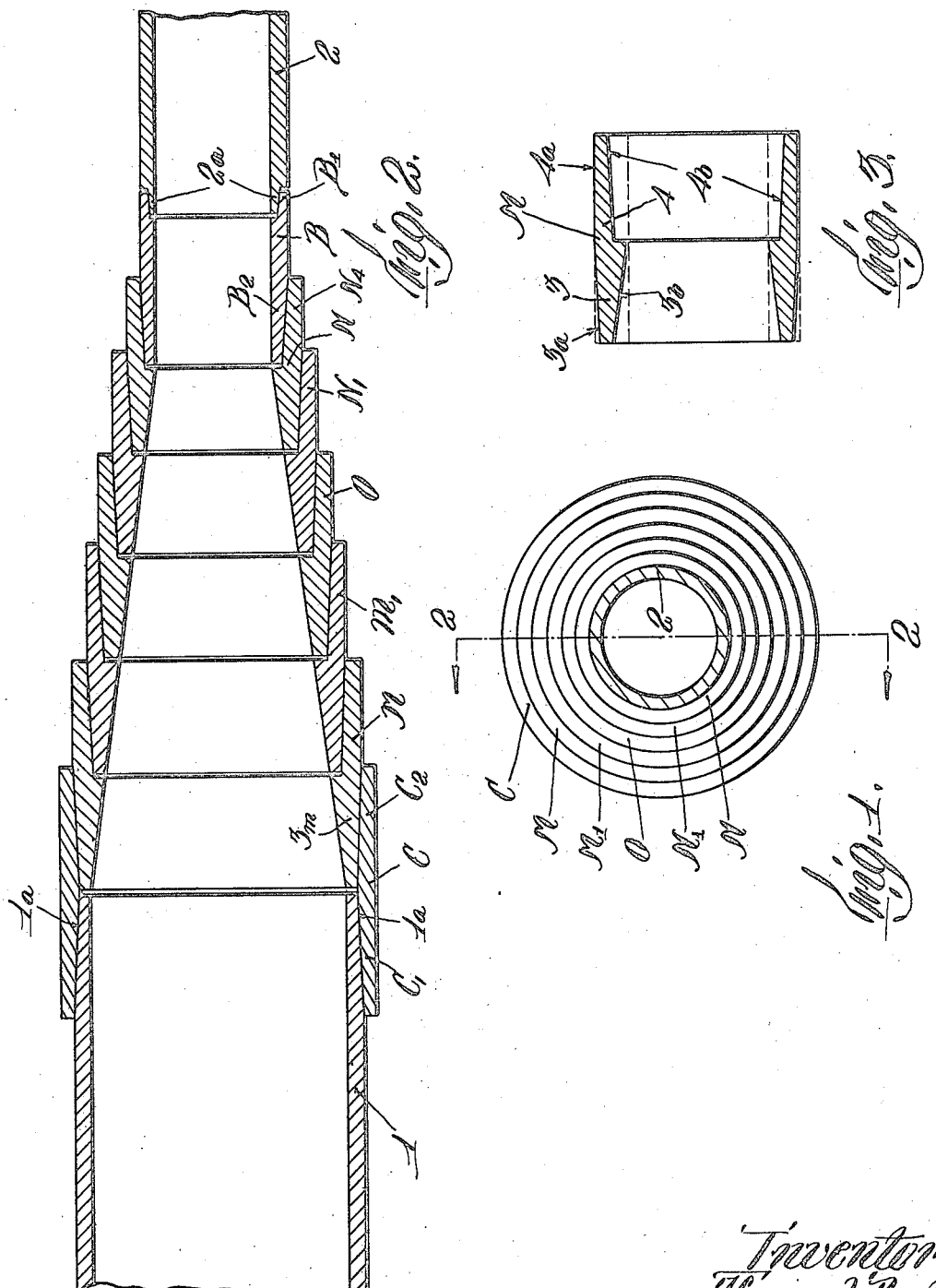

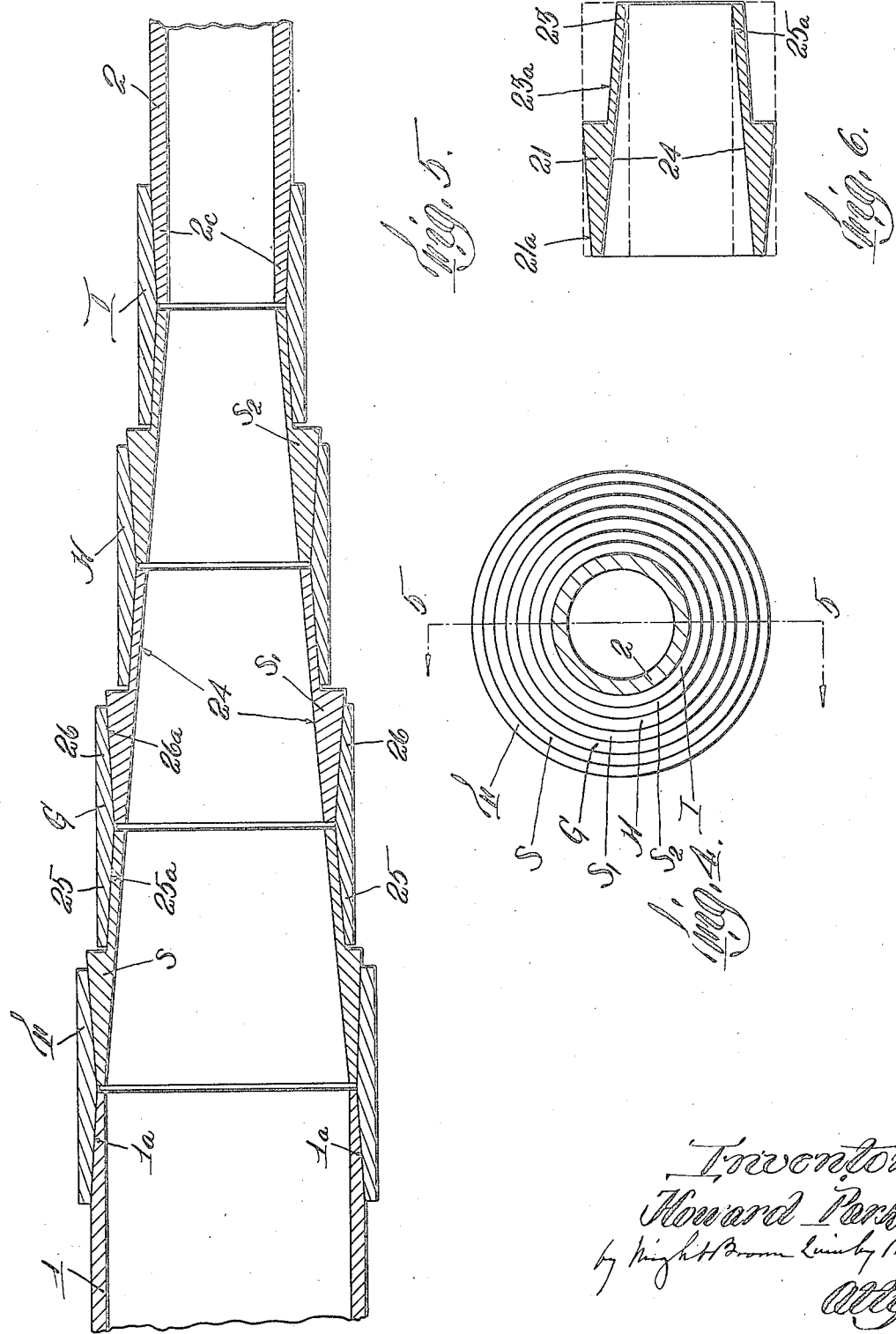

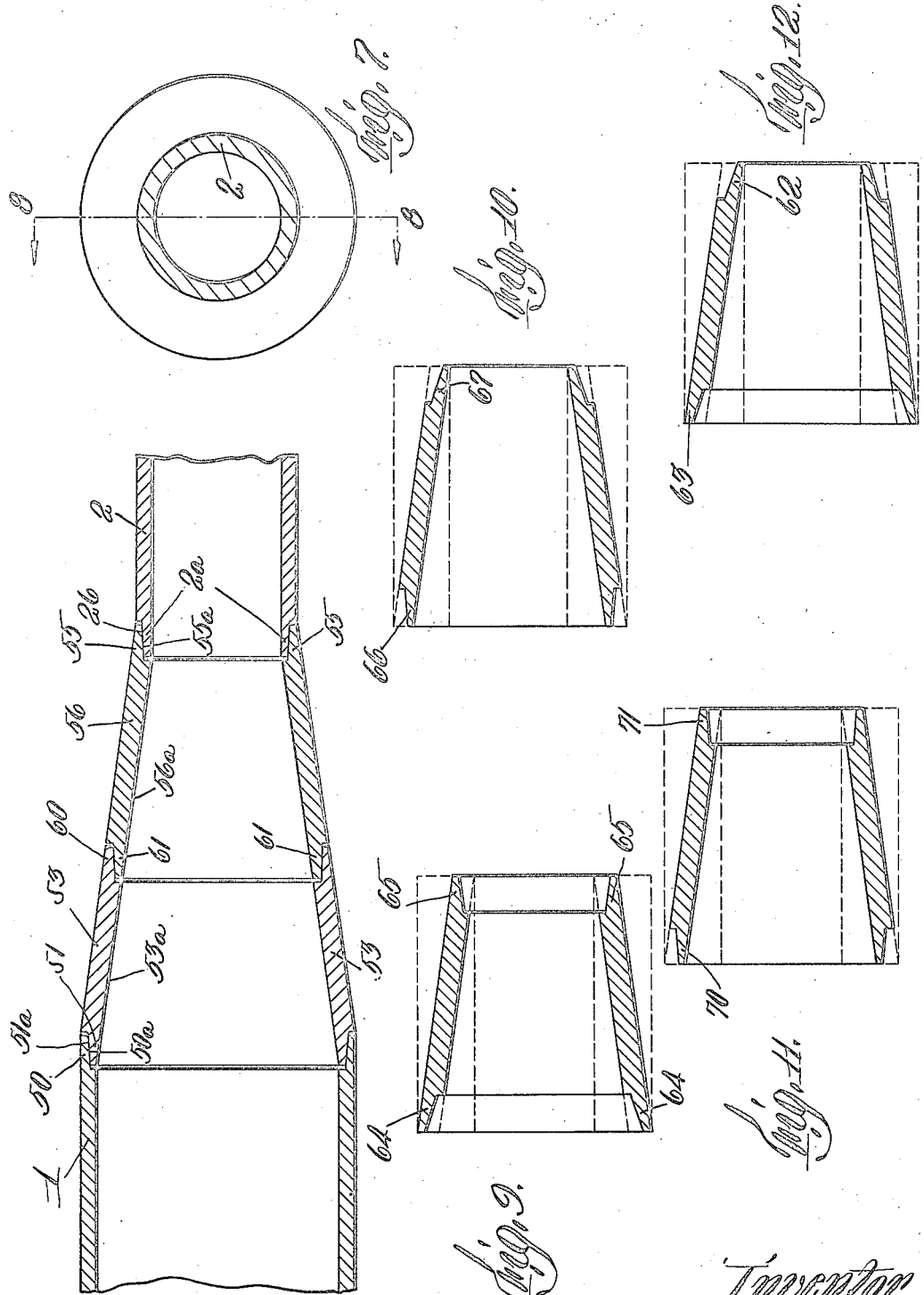

Patented July 30, 1929.

1,722,676

UNITED STATES PATENT OFFICE.

HOWARD PARKER, OF BERLIN, NEW HAMPSHIRE, ASSIGNOR TO BROWN COMPANY, OF BERLIN, NEW HAMPSHIRE, A CORPORATION OF MAINE.

REDUCER FOR FIBROUS CONDUITS.

Application filed September 16, 1925. Serial No. 56,779.

This invention has relation to reducer construction for conduits, and more especially to fibrous reducers adapted for use in connection with cylindrical fibrous conduits.

Such conduits or tubes may be formed by winding a web of cellulose pulp or a sheet of wet paper on a mandrel until a tube having a wall of the desired thickness has been produced, then removing the tube from the mandrel and thoroughly drying it. When employed as a conduit for an electric wiring system or as a pipe, the tube may be waterproofed and rendered electro-insulating by impregnating or saturating it with pitch or other suitable material. As a result of such waterproofing treatment, the strength and rigidity of the tubes are increased and they may be shaped or formed by cutting tools while being turned on a lathe, and the formed or cut surfaces ground to a smooth finish.

When such conduits are employed in practice, it frequently occurs that a connection must be made from a larger to a smaller conduit. Since such conduits are manufactured in standard sizes or diameters, in making a connection between conduits of different diameters, it would ordinarily be necessary to manufacture and keep on hand a number of reducers of various lengths and tapers corresponding to the various reductions to be made. Moreover, in a case where a reduction from a conduit of large diameter to one of small diameter is required, in order to afford a reducer of the required diameter, it would be necessary to first form a tube having a wall of a thickness greatly exceeding the thickness of the wall of a standard tube, and then cut or shape the tube into the desired form. In other words, it would be necessary to form such reducers from specially constructed tubes, which is an uneconomical and impractical procedure.

Hence the object of the present invention is to provide reducers which may be formed from conduits of substantially standard dimensions in a practical and economical manner. This object is attained by employing a plurality of mating reducer sections or members, each section being formed from a conduit of standard dimensions. The sections are adapted to be united with each other and with the ends of the conduits to be connected to form a reducer having a bore or channel tapering from the diameter of the large conduit to that of the small conduit. The reduction from the large to the small conduit, therefore, may take place through one or more intermediate sections or members, the number of sections depending on the amount of reduction required, each of which sections is adapted to be united or mated at once with a conduit of standard diameter, so that the reducing section of the one size may be employed in combination with other sections to connect conduits of various dimensions.

The invention may best be understood from the following description thereof when considered in conjunction with the accompanying drawings in which Figure 1 shows in end elevation a reducer embodying the present invention.

Figure 2 represents a longitudinal section on the line 2—2 of Figure 1.

Figure 3 illustrates a section through a reducer section.

Figure 4 illustrates in end elevation another embodiment of the invention.

Figure 5 shows a section on the line 5—5 of Figure 4.

Figure 6 represents a section through a reducer member employed in the construction of Figure 4.

Figure 7 shows in end elevation a further type of construction embodying the present invention.

Figure 8 represents a section through the construction on the line 8—8 of Figure 7.

Figures 9, 10, 11 and 12 represent sections through individual reducer members which may be employed in connection with the construction of Figure 7.

Referring to Figure 2 of the accompanying drawings, at 1 I have illustrated a large conduit and at 2 a smaller conduit which it is desired to connect therewith. The end portion of the large conduit 1 is represented as having a tapered or wedge formed outer surface $1^a$, and the end portion of the small conduit is represented as being shaped in the form of a plug or male member $2^a$ having a tapered outer surface.

The conduit 1 is united by means of a coupling C with one end of the large reducer section M and the conduit 2 is joined by the coupling B with one end of the small reducer section N. The end sections are united by the intermediate reducer sections $M_1$, O and $N_1$.

Each reducer member or section comprises a plug or male portion 3 formed at one end and a socket or female portion 4 at the other end, the male portion of one member being inserted in the female portion of the adjacent mating member. Each male portion has a tapered outer surface $3^a$ corresponding or complemental to the inner surface $4^b$ of the female portion 4 in which it is inserted. The inner surface $3^b$ of each male portion and which constitutes the interior surface of the reducer is tapered to correspond to the change in diameter desired for that particular section and the outer surface $4^a$ of each female portion is of cylindrical contour corresponding to the curvature of the tube from which it is formed.

The coupling C comprises the sockets $C_1$ and $C_2$ respectively mating with the male portion $1^a$ of the conduit 1 and the male portion $3^m$ of the end section M. Similarly the coupling $B_1$ comprises the male portion $B_2$ mating with the female portion $N_4$ and the female portion $B_1$ mating with the male portion $2^a$ of the conduit 2. Of course it will be understood that the end portions of both the conduits may be similarly formed so that the same type of coupling may be used for both.

Each reducer section is made from a transverse section of a tube, the outline of which is represented in dotted lines in Figure 3. The tube section is turned on a lathe, cut and formed into the reducer section illustrated by the full lines. The mating surfaces are ground smooth so that tight connections or joints may be made by driving one member into the other mating member and without the necessity of packing material. A joint thus formed is ordinarily impervious to moisture, but if desired a waterproof binder, such as asphalt or cement, may be applied at the edges of the sections or entirely around the reducer to insure a perfect waterproof joint.

In place of the construction described, I may employ sections consisting alternately of what may for convenience of designation be termed male and female sections as illustrated in Figures 4 and 5. In this instance the end portions of the large conduit 1 and the small conduit 2 are respectively provided with tapered or wedge formed outer surfaces $1^a$ and $2^c$ and the reducer comprises a plurality of male sections S, $S_1$ and $S_2$, united with one another and with the end portions of the conduits 1 and 2 by a plurality of female sections or couplings F, G, H and I. The conduit 1 is united by means of the coupling F with one end of the large male section S and the conduit 2 is joined by the coupling I with one end of the small male section $S_2$. The end male members are united by the couplings G and H with the intermediate male member S.

Each male member comprises a larger plug 21 at one end and a smaller plug 23 at the other end, respectively, provided with the tapered outer surfaces $21^a$ and $23^a$, which mate with the adjacent female sections. The inner surfaces 24 of the male members are tapered to conform to the reduction of diameter desired and constitute the bore or channel of the assembled reducer.

Each coupling comprises the female portions 25 and 26 at either end, the inner surfaces $25^a$ and $26^a$ of which are tapered to mate with the outer surfaces of the adjacent plugs. As shown, both female portions and the adjacent plugs of adjacent male members are similarly tapered. Both the couplings and male members may be formed from transverse tube sections, the tube section for forming a reducer section being represented by the dotted outline in Figure 6.

In Figures 7 and 8 I have shown a reducer construction which eliminates the necessity for the use of couplings. As shown, the ends of the conduits are formed to mate with the ends of the adjacent sections, which, in turn, are formed to mate with each other or with intermediate sections. For this purpose, the end portion of the conduit 1 is shaped in the form of a socket 50, the inner surface $50^a$ of which is tapered and complemental to the outer surface $51^a$ of a plug 51 formed at the end of the reducer section 53. Similarly, the end portion of the conduit 2 is shaped in the form of a plug $2^a$, the outer surface 26 of which is tapered and complemental to the inner surface $55^a$ of a socket 55 formed at the end of the reducer section 56 and in which it is inserted. The other end of the member 53 is provided with a socket 60 mating with, and in which the plug 61 formed at the other end of the section 56 may be inserted. The inner surfaces $53^a$ and $56^a$ of the sections 53 and 56 are tapered to conform to the variance in diameter between the large and small conduits. Of course, the reducer may comprise a greater number of sections and the form or construction of the ends may vary. For example, in the construction shown in Figures 8 and 11, the end of larger diameter of the reducer section 70 is provided with a plug 70 and the end of smaller diameter with a socket 71. If desired, however, the construction shown in Figure 12, where the end of smaller diameter is provided with a plug 62 and the end of larger diameter with a socket 63, may be employed. Or, as shown in Figure 9, the section may be provided at either end with a socket 64, 65, and used alternately together with the sections such as shown in Figure 10, where both ends are provided with plugs 66, 67. Similarly, the ends of the conduits to be connected may be formed either as plugs or sockets, depending upon the construction of the section to be mated therewith. The dotted outlines shown in Figures 7 to 11 represent the transverse tube sections from which the reducer section may be formed.

As previously indicated, the reducer sections are cut from a tube saturated with a suitable waterproofing compound and formed of successive layers or convolutions of interfelted fibrous material sufficiently matted together or interlocked to form a practically solid, homogeneous wall. The waterproofing compound imparts sufficient strength and rigidity to the tubes to permit them to be subjected to machining or cutting operations.

In tapering the interior of the tube sections or in forming the wedge surfaces, the successive convolutions or layers are cut across. Each section is made sufficiently short, however, so that it is not unduly thinned down and weakened. In the construction shown in Figures 2 and 5, where each reducer section is reinforced by an adjacent section, if desired, a greater interior taper may be had with a wall of a given thickness than in a construction as shown in Figure 8.

Having thus described certain embodiments of this invention, it is evident that various changes and modifications might be resorted to without departing from the spirit or scope of my invention as defined by the appended claims.

What I claim is:

1. A reducing connection for cylindrical fibrous conduits of different diameters, comprising a plurality of fibrous sections united end for end and forming a reducer having a substantially smooth bore uniformly tapering from the diameter of the large to that of the small conduit, the end of one conduit being united to one of the end sections by a coupling and one end of each section being tightly wedged into the end of an adjacent section.

2. A reducing connection for cylindrical fibrous conduits of different standard diameters, comprising a plurality of fibrous sections tightly engaging end for end and forming a reducer having a substantially smooth bore uniformly tapering from the diameter of the large to that of the small conduit, said reduction taking place through one or more intermediate sections, each section of which is united with another section.

3. A method of forming a section for a sectional reducing connection for cylindrical fibrous conduits of different diameters, which comprises cutting off a transverse section from a cylindrical conduit consisting of successive layers of matted interfelted fibrous material, cutting the interior of the tube section across the layers of fibrous material to form a tapered bore, and forming the ends of the section to engage mating sections having bores tapered as continuations of the bore of said sections.

4. A reducing connection for fibrous conduits having a uniformly tapering, substantially smooth bore and comprising a plurality of sections of fibrous material saturated with waterproofing material, the ends of each of said sections being tightly wedged into the ends of the adjacent sections.

In testimony whereof I have affixed my signature.

HOWARD PARKER.